United States Patent
Kremsmair et al.

(10) Patent No.: US 6,203,649 B1
(45) Date of Patent: Mar. 20, 2001

(54) METHOD OF MANUFACTURING A FLAT FRICTION RING

(75) Inventors: Christian Kremsmair, Vorchdorf; Gerhard Hartner, Bad Wimsbach, both of (AT)

(73) Assignee: Miba Frictec GmbH & Co. KG., Laakirchen (AT)

( * ) Notice: Subject to any disclaimer, the term of this patent is extended or adjusted under 35 U.S.C. 154(b) by 408 days.

(21) Appl. No.: 08/683,826

(22) Filed: Jul. 18, 1996

(30) Foreign Application Priority Data

Jul. 25, 1995 (AT) .................................... 1261/95

(51) Int. Cl.$^7$ .............................. B32B 31/00; F16D 69/04
(52) U.S. Cl. .......................... 156/211; 156/256; 156/264; 156/583.1; 192/70.12; 192/70.14; 192/113.36; 188/264 R; 188/264 B; 188/264 D
(58) Field of Search ...................................... 156/256, 264, 156/583.1, 211; 192/70.12, 70.14, 107 R, 43.36; 188/218 XL, 218 R, 264 R, 264 B, 264 D

(56) References Cited

U.S. PATENT DOCUMENTS

| | | | |
|---|---|---|---|
| 1,210,131 | * 12/1916 | Achtmeyer | 192/107 R |
| 2,037,440 | * 4/1936 | Taylor | 156/211 |
| 2,046,988 | * 7/1936 | Winter | 156/211 |
| 4,260,047 | * 4/1981 | Nels | 192/70.14 |
| 4,726,455 | * 2/1988 | East | 192/70.14 |
| 4,878,282 | * 11/1989 | Bauer | 29/149.5 C |

FOREIGN PATENT DOCUMENTS

| | | | |
|---|---|---|---|
| 0 305 582 | 3/1989 | (EP) | F16D/13/64 |
| 0 583 516 | 2/1994 | (EP) | F16D/69/04 |

* cited by examiner

*Primary Examiner*—Linda L Gray
(74) *Attorney, Agent, or Firm*—Collard & Roe, P. C.

(57) ABSTRACT

There is described a method of manufacturing a flat friction ring which consists of a supporting ring (1) and a friction lining (2) provided on at least one side of the supporting ring and at least approximately forming radial oil grooves (3), which friction lining is first cut out of a friction lining web including slits (5) extending from at least one circumferential side for forming the future oil grooves (3), and is then glued onto the supporting ring (1). This method is characterized in that the friction lining (2) is cut out of the friction lining web in the form of a strip (7) and in the area of the connecting webs (6) between the friction lining sectors (4) separated from each other by the slits (5) is bent in a polygon-like manner to form a ring and is glued onto the supporting ring (1).

4 Claims, 1 Drawing Sheet

METHOD OF MANUFACTURING A FLAT FRICTION RING

BACKGROUND OF THE INVENTION

1. Field of the Invention

This invention relates to a method of manufacturing a flat friction ring which consists of a supporting ring and a friction lining provided on at least one side of the supporting ring and forming, at least approximately radial oil grooves, which friction lining is first cut out of a friction lining web including slits extending from at least one circumferential side for forming the future oil grooves, and is then glued onto the supporting ring.

2. Description of the Prior Art

For manufacturing flat friction rings it is known (EP 0 305 582 A1) to punch out the friction lining from a friction lining web as a self-contained ring with slits forming the future oil grooves, which friction lining web is made of an organic friction material as in paper making, and to glue this friction lining ring onto the supporting ring. Cutting out a self-contained friction lining ring, which already includes the slits for the future oil grooves, ensures an easy and inexpensive manufacture, but due to the annular shape of the friction linings, there is a high waste of material of the friction lining web, so that the material utilization is unsatisfactory. If, according to another known manufacturing method (EP 0 583 516 A1), the friction lining is composed of single friction lining sectors, which are cut off from a strip of friction lining and are glued onto the supporting ring in a way spaced from each other so as to obtain radial oil grooves between adjacent friction lining sectors, a good material utilization regarding the friction lining is achieved, which has, however, the considerable disadvantage of an expensive and time-consuming manufacture, because the individual non-coherent friction lining sectors must be positioned accordingly before they are glued onto the supporting ring.

It is therefore the object underlying the invention to improve a method of manufacturing a flat friction ring of the kind described herein above, so that a simple, quick and inexpensive handling of the friction lining can be combined with a good utilization of material.

SUMMARY OF THE INVENTION

This object is solved by the invention in that the friction lining is cut out of the friction lining web in the form of a strip, and in the area of the connecting webs between the friction lining sectors separated from each other by the slits is bent in a polygon-like manner to form a ring and is glued onto the supporting ring.

By cutting friction lining strips out of the friction lining web, a good material utilization of the material web can be ensured, since at least in the case of a straight extension of the strips the individual strips can be placed side by side, so that the longitudinal edge, which forms the future outer circumference of the friction lining, each rests against the longitudinal edge forming the future inner circumference. When a curved extension of the strip is chosen, which may become necessary when a limited number of friction lining sectors is required in connection with a limited slit width as a result of the maximum possible bending angle between the friction lining sectors defined by the slit formation, the amount of waste produced is restricted to the slits and the gusset area formed between the bent friction lining strips. Since the friction lining sectors are separated from each other by the slits forming the future oil grooves except for a remaining connecting web, which provides for a hinge connection between the friction lining sectors, the friction lining strips preferably cut out by punching can each easily be bent to form a polygon ring, which can be glued onto a corresponding supporting ring. Due to the coherent friction lining sectors an easy handling is possible, which provides for a quick and inexpensive manufacture with a good utilization of material. The deviation of the polygon ring from the circular shape is irrelevant for the function of the friction ring, especially since adjacent their longitudinal edges the friction lining sectors can be cut out along circular arcs, which are adapted to the outside and/or inside diameter of the supporting ring.

Different circular arc radii in the area of the outer and inner circumference, however, produce an insignificant amount of waste as a result of the gussets formed between the abutting outer and inner sides of the friction lining strips. In order to avoid such waste, although it is a comparatively small amount, the friction lining sectors of the friction lining strips formed between the slits can be cut out along corresponding circular arcs on the outer and inner circumference. The resulting deviations from the outer and/or inner circumference of the supporting ring are irrelevant for the operation of the finished friction ring.

Particularly advantageous manufacturing conditions are achieved by a further embodiment of the invention when a double-sided adhesive film is glued onto the side of the friction lining web facing the supporting ring, before the friction lining strip is cut out, by means of which adhesive film the friction lining can be glued onto the supporting ring after having been cut out. This double-sided adhesive film not only facilitates the glueing of the friction lining strip cut out of the friction lining web onto the supporting ring, but also provides for a reinforcement of the friction lining strips in the area of the connecting webs between the friction lining sectors, so that these connecting webs can be designed sufficiently narrow in a way advantageous for bending within the lining plane, without impairing the coherence of the friction lining sectors during the handling of the friction lining strips.

When bending the cut-out friction lining strips in a polygon-like manner, tensile forces are produced in the outer area of the connecting webs, and compressive forces are produced in the inner area of the connecting webs, which might include the risk of these connecting webs unfolding from the friction lining plane. In order to avoid disadvantages resulting therefrom, the friction lining can be glued onto the supporting ring by means of hot pressing, so that the compressive forces acting upon the supporting ring and applied to the friction lining strips in the area of the connecting webs reliably prevent such an unfolding.

The inventive method of manufacturing a flat friction ring will now be explained in detail with reference to the drawing, wherein:

DESCRIPTION OF THE PREFERRED EMBODIMENT

Figure 1:
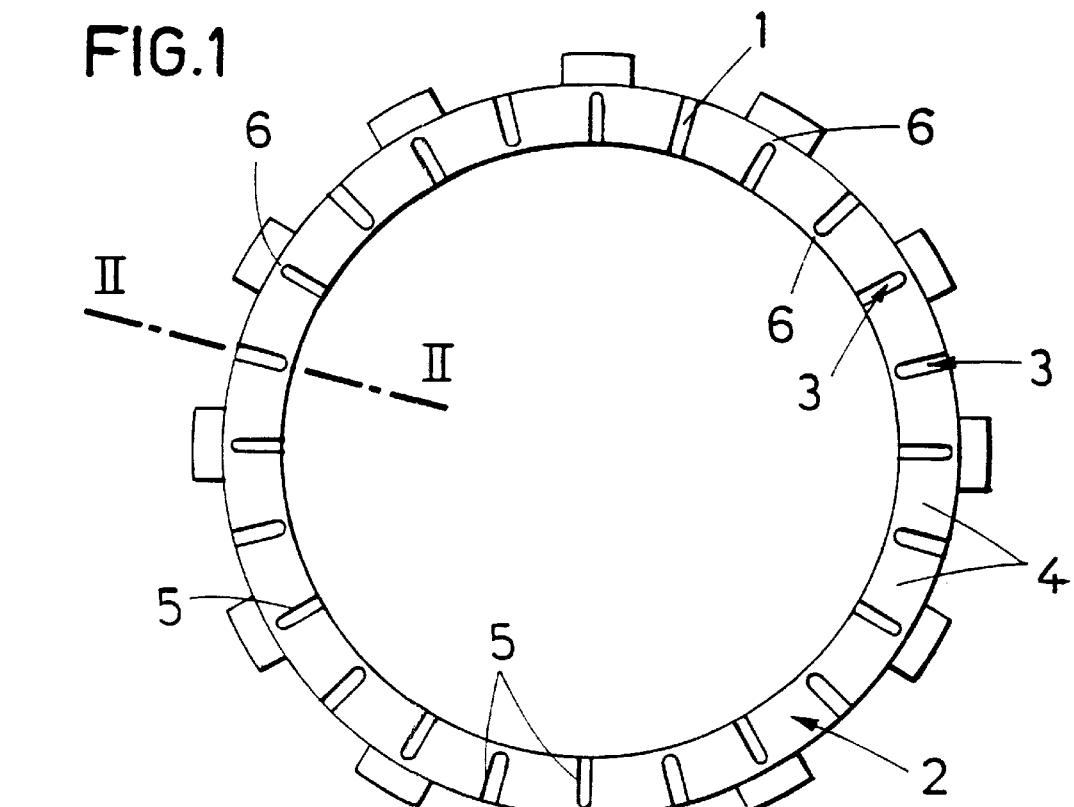
FIG. 1 shows a simplified plan view of a friction ring to be manufactured.

The friction ring as represented consists of a steel supporting ring 1 which is provided with a friction lining 2 on both sides. This friction lining 2, which is for instance produced like paper from an organic friction material, comprises individual friction lining sectors 4 formed between radial oil grooves 3. According to the illustrated embodiment, these oil grooves 3 are formed by slits 5 alternately extending from the inner and the outer circumference, said slits extending over the width of the friction lining 2 except for a narrow connecting web 6 provided between the friction lining sectors 4. The oil grooves 3 extending from the inner circumference side have the advantage that the oil subjected to the centrifugal force is retained in the oil grooves 3 and supports the separation of adjacent friction rings.

Figure 2:
FIG. 2 shows a section taken along line II—II of FIG. 1 on a larger scale.
Figure 3:
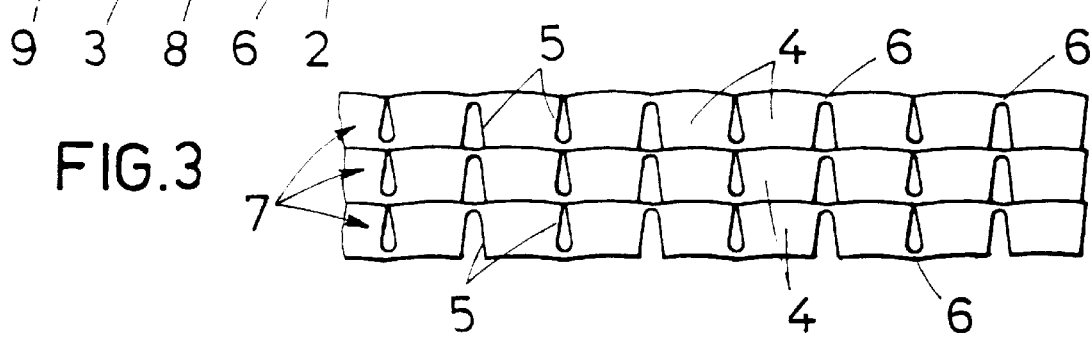
FIG. 3 shows a plan view of parts of a plurality of friction lining strips placed side by side, to be cut out of a friction lining web.
Figure 4:
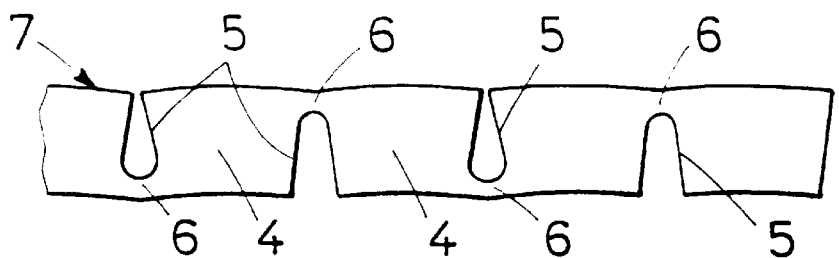
FIG. 4 shows a part of a friction lining cut out of a friction lining web on a larger scale.

For manufacturing the friction ring as described, a friction lining 2 is glued onto the supporting ring 1. For this purpose, friction lining strips 7 are punched out of a suitable friction lining web, which friction lining strips are placed side by side and have slits 5 alternately extending from both longitudinal sides. Since these friction lining strips 7 have a conforming extension of the longitudinal edges on both sides, they join up with each other without a distance, so that, when these friction lining strips 7 are punched out, waste is only produced in the slit areas. As is shown in FIGS. 3 and 4, the friction lining sectors 4 are limited between the slits 5 by corresponding circular arcs, so that after bending of the strips at the connecting webs 6 formed in the area of the slits 5, sectors 4 form polygons producing annular friction linings 2, which according to FIGS. 1 and 2 can be glued onto a supporting ring 1. When forming the slits 5, the bending angle between the friction lining sectors 4 must of course be considered, by which the flanks of the slits 5 must deviate from their future extension in the area of the friction lining strips 7. This results in a savings of material for the slits 5 extending from the outer circumference.

For glueing on the friction lining strips 7 bent in a polygon to form a ring, the supporting ring 1 and/or the friction lining strips 7 might be provided with an adhesive layer. Particularly simple conditions are, however, obtained by means of a double-sided adhesive film, which is first applied to the friction lining web, from which the friction lining strips 7 are then cut out. For glueing such friction lining strips 7 onto both sides of a supporting ring 1, only one friction lining strip 7 with an adhesive film 8 pointing upwards must first of all be inserted into a corresponding mold 9, as indicated in FIG. 2 by dash-dotted lines, before the supporting ring 1 is placed on this friction lining strip 7 held in an annular shape in the mold 9 and is covered by a further lining strip 7, which is likewise forced into the annular shape adapted to the supporting ring 1 by the mold 9. Then, the mold 9 can be closed by means of a lid 10, and the friction ring can be heated by applying pressure until the glueing through the adhesive films 8 is cured.

What is claimed is:

1. A method of manufacturing a flat friction ring consisting essentially of a supporting ring and a friction lining on at least one side of the supporting ring, the friction lining defining at least approximately radial oil grooves, which comprises the steps of (a) cutting a strip out of a friction lining web, the strip defining a flat plane and
  (1) having slits extending from at least one longitudinally extending side of the strip and spaced from each other to form sectors therebetween, and
  (2) the slits being spaced from an opposite longitudinally extending side of the strip to leave connecting webs between the sectors, (b) bending the strip at the connecting webs about axes extending perpendicularly to the plane until the sectors form a polygon producing an annular friction lining wherein the slits define the oil grooves, and (c) gluing the annular friction lining onto the side of the supporting ring.

2. The manufacturing method of claim 1, wherein the longitudinally extending sides of the sectors of the strip are cut out along corresponding circular arcs.

3. The manufacturing method of claim 1, wherein a film being adhesive on both sides is glued onto the friction lining web before the strip is cut out, and the cut-out annular friction lining is glued onto the supporting ring by means of the film.

4. The manufacturing ring of claim 3, wherein the annular friction lining is glued onto the supporting ring by means of hot pressing.

* * * * *